(12) United States Patent
Busker et al.

(10) Patent No.: US 11,190,019 B2
(45) Date of Patent: Nov. 30, 2021

(54) METHOD FOR SUPPLYING WIND ENERGY PLANT COMPONENTS WITH ENERGY AND ENERGY SUPPLY DEVICE AND WIND ENERGY PLANT USING THE SAME

(71) Applicant: Wobben Properties GmbH, Aurich (DE)

(72) Inventors: Kai Busker, Großefehn (DE); Stefan Heller, Aurich (DE); Stefan Gertjegerdes, Aurich (DE); Ingo Mackensen, Aurich (DE); Juri Wilhelm, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/651,317

(22) PCT Filed: Oct. 1, 2018

(86) PCT No.: PCT/EP2018/076556
§ 371 (c)(1),
(2) Date: Mar. 26, 2020

(87) PCT Pub. No.: WO2019/063835
PCT Pub. Date: Apr. 4, 2019

(65) Prior Publication Data
US 2020/0227918 A1    Jul. 16, 2020

(30) Foreign Application Priority Data

Sep. 29, 2017 (DE) .......................... 102017122695

(51) Int. Cl.
*H02J 11/00* (2006.01)
*H02J 3/32* (2006.01)
*H02J 1/00* (2006.01)

(52) U.S. Cl.
CPC ............... *H02J 3/32* (2013.01); *H02J 11/00* (2013.01); *H02J 1/00* (2013.01); *H02J 2300/28* (2020.01)

(58) Field of Classification Search
CPC .......... H02J 11/00; H02J 2300/28; H02J 1/00; H02J 3/32; H02J 9/067
See application file for complete search history.

(56) References Cited

U.S. PATENT DOCUMENTS

| 7,352,076 | B1 | 4/2008 | Gabrys |
| 8,108,079 | B2 | 1/2012 | Wobben |
| 8,183,707 | B2 | 5/2012 | Siebers et al. |
| 8,416,052 | B2 | 4/2013 | MacLennan |
| 8,624,702 | B2 | 1/2014 | MacLennan et al. |

(Continued)

FOREIGN PATENT DOCUMENTS

| CN | 103080538 A | 5/2013 |
| CN | 103140670 A | 6/2013 |

(Continued)

*Primary Examiner* — Harry R Behm
(74) *Attorney, Agent, or Firm* — Seed IP Law Group LLP (57) ABSTRACT

Provided is a method of supplying at least one component of a wind turbine with energy. The energy during operation of the wind turbine is taken from energy generated using a generator of the wind turbine and provided for supply to the at least one component of the wind turbine. Provided is an energy supply device for performing the method and a wind turbine having the energy supply device.

16 Claims, 5 Drawing Sheets

(56) References Cited

U.S. PATENT DOCUMENTS

| | | |
|---|---|---|
| 8,902,035 B2 | 12/2014 | MacLennan |
| 9,007,788 B2* | 4/2015 | Lu .................... H02J 3/46 |
| | | 363/37 |
| 9,217,418 B2 | 12/2015 | Bodewes et al. |
| 9,429,142 B2 | 8/2016 | Yu et al. |
| 9,997,922 B2 | 6/2018 | Beekmann et al. |
| 10,027,266 B2 | 7/2018 | Beekmann et al. |
| 10,063,060 B2 | 8/2018 | Beekmann et al. |
| 10,063,093 B2 | 8/2018 | Beekmann |
| 2008/0001408 A1 | 1/2008 | Liu et al. |
| 2008/0054641 A1 | 3/2008 | Voss |
| 2008/0224670 A1 | 9/2008 | Liu et al. |
| 2009/0108582 A1 | 4/2009 | Siebers et al. |
| 2009/0230689 A1* | 9/2009 | Burra ................. H02J 9/062 |
| | | 290/55 |
| 2009/0283128 A1 | 11/2009 | Zhang et al. |
| 2011/0057443 A1* | 3/2011 | Rivas .................. F03D 7/0224 |
| | | 290/44 |
| 2011/0140534 A1 | 6/2011 | Yasugi |
| 2011/0227670 A1 | 9/2011 | MacLennan |
| 2012/0056425 A1 | 3/2012 | Cousineau |
| 2012/0075048 A1 | 3/2012 | MacLennan et al. |
| 2012/0091811 A1* | 4/2012 | Heidenreich .......... H02J 9/062 |
| | | 307/65 |
| 2012/0139680 A1 | 6/2012 | MacLennan |
| 2013/0099565 A1* | 4/2013 | Sachs .................. H02J 3/382 |
| | | 307/25 |
| 2013/0106108 A1 | 5/2013 | De Boer et al. |
| 2013/0175801 A1 | 7/2013 | Matzen |
| 2013/0184884 A1 | 7/2013 | More et al. |
| 2013/0197704 A1 | 8/2013 | Pan et al. |
| 2015/0001848 A1* | 1/2015 | Imaie .................... H02P 9/006 |
| | | 290/44 |
| 2015/0124496 A1 | 5/2015 | Yu et al. |
| 2016/0032891 A1 | 2/2016 | Busker et al. |
| 2016/0294274 A1 | 10/2016 | Wennerstrom et al. |
| 2016/0329714 A1 | 11/2016 | Li et al. |
| 2016/0336888 A1 | 11/2016 | Busker |
| 2017/0012551 A1 | 1/2017 | Kondo et al. |
| 2017/0373533 A1 | 12/2017 | Beekmann |
| 2018/0283981 A1 | 10/2018 | Brenner et al. |
| 2018/0335014 A1 | 11/2018 | Achenbach et al. |
| 2018/0358814 A1* | 12/2018 | Rates Palau ........... H02J 9/04 |

FOREIGN PATENT DOCUMENTS

| | | |
|---|---|---|
| CN | 105074203 A | 11/2015 |
| CN | 105917542 A | 8/2016 |
| DE | 102011122433 A1 | 6/2013 |
| EP | 1137149 A2 | 9/2001 |
| EP | 2056210 A2 | 5/2009 |
| EP | 2236821 A1 | 10/2010 |
| EP | 2397688 A1 | 12/2011 |
| EP | 2806159 A1 | 11/2014 |
| JP | S59176473 A | 10/1984 |
| RU | 2603712 C2 | 11/2016 |
| WO | 2005113964 A1 | 12/2005 |
| WO | 2009082326 A1 | 7/2009 |
| WO | 2016120260 A1 | 8/2016 |

\* cited by examiner

METHOD FOR SUPPLYING WIND ENERGY PLANT COMPONENTS WITH ENERGY AND ENERGY SUPPLY DEVICE AND WIND ENERGY PLANT USING THE SAME

BACKGROUND

Technical Field

The invention concerns energy supply of wind turbines, in particular components of wind turbines, comprising an energy supply device of the wind turbine and a method for the same.

Description of the Related Art

Wind turbines have long been known. In wind turbines an aerodynamic rotor drives a generator rotor member of a generator so that the generator converts kinetic energy obtained from the wind into electrical energy. That electrical energy is fed by the generator by way of a transformer to a supply grid connected to the wind turbine. For that purpose the wind turbine is connected to the supply grid by way of a grid connection point.

Electric supply grids are known and electrical energy is distributed therewith between energy storage systems and energy consumers. Such an electric supply grid is nowadays operated with an alternating current (AC) voltage at a predetermined grid frequency, mostly 50 hertz (Hz) or 60 Hz. Both the storage systems and also the consumers have been set to that frequency.

Therefore such supply grids are also suitable for supplying power to the wind turbine itself. It is therefore usual for the wind turbine itself, in particular components thereof, namely the electric components, to be supplied with electrical energy from the supply grid. Components which require an energy supply are for example components of the wind turbine, cooling devices, mechanical actuators and the control system itself. As an example of components mention may be made for instance of the drive for a yaw adjustment of the wind turbine, the adjusting motors for rotor blade adjustment or various cooling devices for cooling the generator and/or the inverters. Further components are the electrical open-loop and closed-loop control devices which actuate mechanical components of the wind turbine for operation thereof.

The supply grid with which the wind turbine itself is supplied in known fashion with energy is subject in that case to voltage fluctuations in the region of 10%. Those grid voltage fluctuations are limited by regulatory requirements so that the specified grid voltage fluctuations are kept below 10% by suitable regulating mechanisms. By virtue of the energy supply grid which is becoming ever more complex however there are discussions of increasing those limits in respect of grid voltage fluctuations as the regulating mechanisms can only observe the 10% limit with a very high level of effort and outlay.

Because of the grid voltage fluctuations which are usual at the present time and which will probably even increase after relaxation of the regulations increasingly rising demands are being made on the wind turbine or the components thereof in order to guarantee reliable operation of the wind turbine with those grid voltage fluctuations. For that purpose smoothing and compensation circuits are respectively provided for the individual components of a wind turbine in order to make an adequate voltage available for operation for sensitive parts of the components at any time while on the other hand acting to prevent damage to the components by virtue of an excessively high voltage.

Those additional smoothing and compensation circuits involve an additional cost factor in production of the wind turbine, in particular as it is therefore no longer possible to use standard components which do not include such compensation circuits as standard.

In the application from which the present application claims priority the German Patent and Trade Mark Office searched the following art: US 2011/0140534 A1 and US 2012/0056425 A1.

BRIEF SUMMARY

Disclosed herein is providing an energy supply for the wind turbine, which affords energy with comparatively lesser voltage fluctuations than the grid voltage of a supply grid. Provided herein is a method of supplying at least one component, namely an electrical component, of a wind turbine with energy by an energy supply device. According to the method in operation of the wind turbine the energy is taken from the energy generated with the generator of the wind turbine by the energy supply device and supplied to the component of the wind turbine. The case described herein therefore identifies operation of the wind turbine, which for example is to be distinguished from a starting phase of the wind turbine in which the wind turbine is being brought up to speed. This operation therefore denotes the state of the wind turbine in which kinetic energy from the wind is being converted into electrical energy with the generator of the wind turbine and is fed into an electric supply grid connected to the wind turbine.

Not all the electrical energy is fed into the supply grid. Rather a part of the electrical energy which is generated with the generator is not fed into the supply grid but supplies components of the wind turbine with that energy. There is therefore no longer any need to take energy from the supply grid which is subject to high fluctuations, for example in regard to the voltage, for supplying the components. Components here are for example the control system of the wind turbine, control systems of the inverters, a control system of the pod, coolant pumps, pitch drives, yaw drives, electrical items of equipment in the tower and the pod like for example lighting and ventilation.

In operation of the wind turbine the electrical energy of the wind turbine, for supplying the components of the wind turbine, is taken directly from the electrical energy generated with the generator of the wind turbine. That energy is subject to lesser fluctuations, in particular in regard to the voltage thereof, than the grid voltage so that it is possible to dispense with compensation components of the individual components of the wind turbine.

In addition, provided is an energy supply device with which preferably the above-mentioned method is carried out. The energy supply device has on the one hand an input which is electrically connected to the generator of a wind turbine and on the other hand an output connected to a component of the wind turbine. The energy supply device supplies the component with energy generated by the generator.

According to a first embodiment the energy generated with the generator is rectified with a rectifier and put into intermediate storage in a direct current (DC) voltage intermediate circuit. The energy for supplying the component of the wind turbine is taken from the DC voltage intermediate circuit by the energy supply device. The energy supply device thus has an input which is or can be connected to the DC voltage intermediate circuit. By virtue of a feed of the energy generated with the generator into a DC voltage intermediate circuit a stable DC voltage which involves substantially no or only slight fluctuations is firstly provided for the component of the wind turbine. A stable substantially fluctuation-free DC voltage can be easily converted into a defined voltage for the supply to the components of the wind turbine so that substantially no further voltage fluctuations can occur. It is thus possible to dispense with additional components for fluctuation compensation.

According to a further embodiment of the energy supply device it is accordingly connected to the DC voltage intermediate circuit in order to take from the DC voltage intermediate circuit the energy for supply to the components of a wind turbine.

According to a further embodiment the voltage of the energy taken from the DC voltage intermediate circuit to supply the components with energy is fed to an inverter of the energy supply device and converted into an AC voltage in the inverter. That inverter of the energy supply device is different from an inverter which converts the voltage of the intermediate circuit into an AC voltage for provision for the supply grid. Accordingly the energy supply device includes an inverter to convert the voltage of the energy taken from the DC voltage intermediate circuit into an AC voltage which serves to supply the components.

Thus besides the inverter which converts an energy provided by the generator into an AC voltage at a frequency suited to the supply grid there is a specific inverter in the energy supply device in order to provide an AC voltage at a frequency suited to the components. In that way it is possible for the inverter of the energy supply device to be manufactured in such a way that it can provide a frequency suitable for the components, which for example is in particular fluctuation-free.

In that respect it can also be taken into account that components can involve a different demand on the frequency of an AC voltage than the grid. If for example for grid support the energy provided by the generator, which is to be fed into a supply grid, is particularly adapted in regard to its AC voltage frequency, then independently thereof an AC voltage frequency adapted to the components can still be provided by the inverter of the energy supply device. Energy supply for the components is thus effected independently of a frequency which is possibly adapted to the grid demands.

According to a further embodiment the AC voltage converted by the inverter of the energy supply device is filtered with a filter. That filter preferably has an inductance or choke and/or at least one capacitor. Accordingly the energy supply device in accordance with an embodiment includes a filter, more specifically preferably an inductance or choke and/or at least one capacitor in order to filter the AC voltage of the energy supply device, that is converted with the inverter.

That filtering action serves in particular for smoothing the AC voltage which is for example "chopped up" at the output of the inverter. A smoothed AC voltage involving a substantially steady sinusoidal configuration is obtained in that way. As a result the demands in regard to the components of a wind turbine in respect of their robustness in relation to unsteady AC voltages are reduced.

In a further embodiment there is provided a transformer in the energy supply device in order to convert the voltage of the energy which is taken from the DC voltage intermediate circuit and converted into an AC voltage into a voltage which is suited to the components. In that respect preferably the AC voltage is converted into a voltage of 400 V. Suitable voltage amplitudes for the components can thus be provided in that way.

According to a further embodiment the energy supply device includes an energy storage device which can be connected to the DC voltage intermediate circuit by way of the input of the energy supply device. The energy storage device is in particular an accumulator or a so-called "power capacitor". Accordingly the components of the wind turbine can be supplied with energy from the energy storage device when the generator is not producing any energy while the energy storage device can be charged up from the DC voltage intermediate circuit.

In a further embodiment of the method, in the situation where no energy is available in the DC voltage intermediate circuit or in the energy storage device which is possibly provided, the at least one component is provided with energy from a supply grid connected to the wind turbine. Preferably for that purpose the transformer of the energy supply device, for example on its secondary side, with which the components are also supplied with energy, is connected at the same time to a grid feed transformer of the wind turbine by way of a further input of the energy supply device. If for example the energy from an energy storage device of the energy supply device is used up when the wind turbine is in an emergency mode a renewed start-up of the wind turbine can be effected by taking energy from the supply grid.

According to a further embodiment the energy supply device has a rectifier in order to provide energy fed to the energy supply device from the supply grid for an exciter circuit of the generator at a further output and/or the energy storage device, in particular for charging purposes.

In a further embodiment there is provided a change-over switch to an external supply of the basic electrical infrastructure of the components, for example the lighting system, the power outlets and so forth. For that purpose the energy supply device includes a further input for the connection of an external supply which for example is an external power assembly. In that way the basic infrastructure can be operated while all other installation components can be separated from the grid. Examples of this are that there is no supply grid, for example during construction of the wind turbine, failure of the supply grid or repair or maintenance operations on the transformer or the energy supply device.

BRIEF DESCRIPTION OF THE SEVERAL VIEWS OF THE DRAWINGS

Further configurations will be apparent from the embodiments by way of example described in greater detail with reference to the Figures.

DETAILED DESCRIPTION

Figure 1:
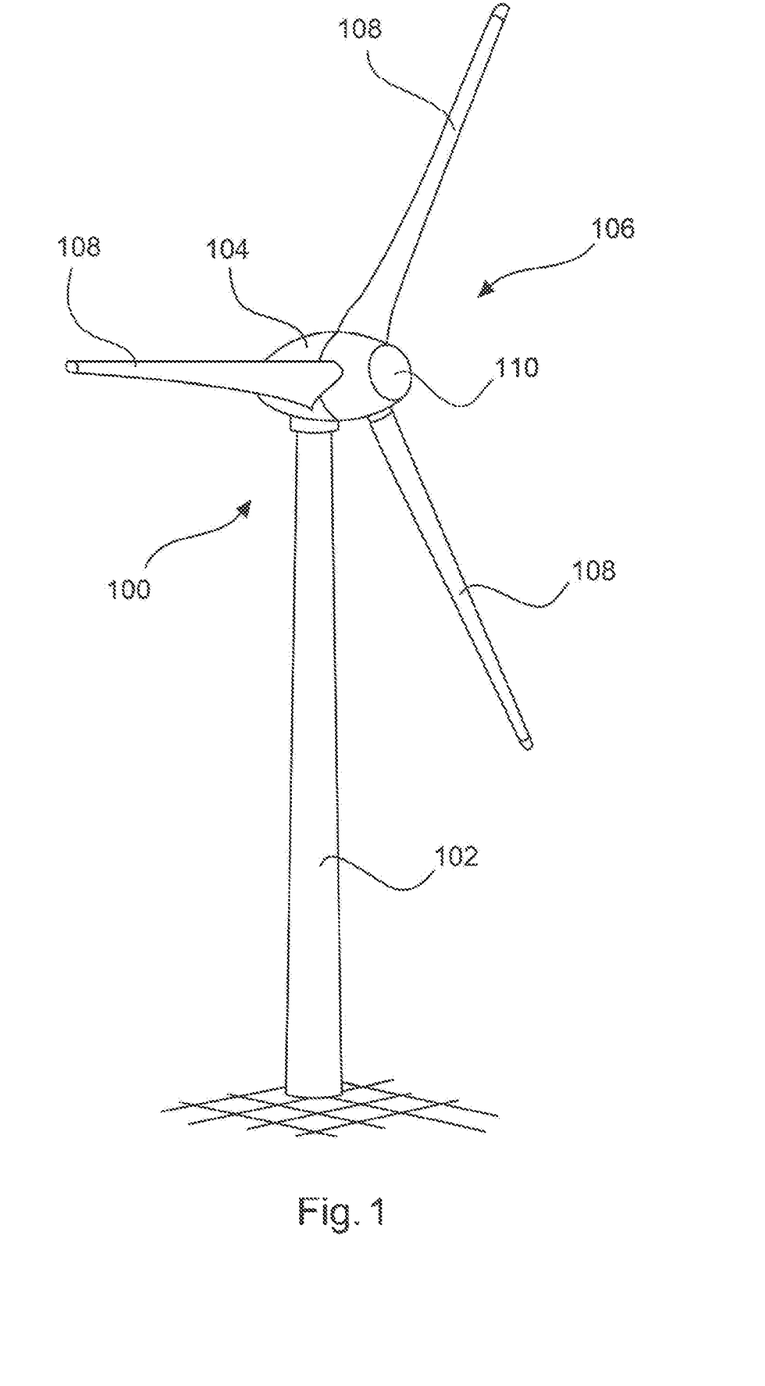
FIG. 1 shows a wind turbine.

FIG. 1 shows a diagrammatic view of a wind turbine 100 according to the disclosure. The wind turbine 100 has a tower 102 and a pod 104 on the tower 102. Provided at the pod 104 is an aerodynamic rotor 106 having three rotor blades 108 and a spinner 110. The aerodynamic rotor 106 is caused to rotate in operation of the wind turbine by the wind and thus also rotates an electrodynamic rotor or rotor member of a generator directly or indirectly coupled to the aerodynamic rotor 106. The electric generator is arranged in the pod 104 and generates electrical energy. The pitch angle of the rotor blades 108 can be varied by pitch motors at the rotor blade roots 108*b* of the respective rotor blades 108.

Figure 2:
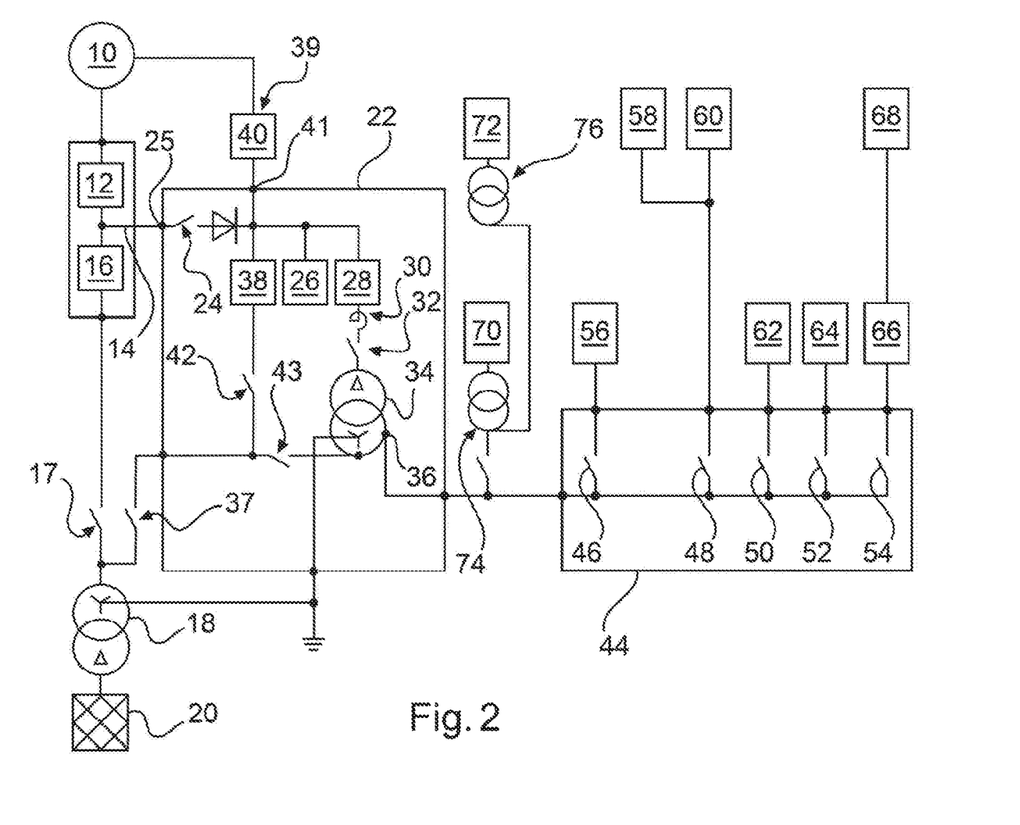
FIG. 2 shows an energy supply system of a wind turbine.

FIG. 2 shows an energy supply system in a wind turbine 100. The wind turbine 100 has a generator 10 which generates electrical energy. The electrical energy is rectified by way of a rectifier 12 and fed into a DC voltage intermediate circuit 14. Only one rectifier 12 is shown here for the sake of better clarity of the drawing, in which respect, in accordance with further embodiments, the rectifier consists of or includes a plurality of modules, that is to say a plurality of rectifiers 12. From the DC voltage intermediate circuit 14 the energy is fed with a rectified voltage to an inverter 16 which converts the rectified voltage into an AC voltage at a frequency adapted to the grid requirements. The energy with the AC voltage is then transformed by way of a closed switch 17 and by way of a grid transformer 18 to a suitable voltage for a supply grid 20 connected to the wind turbine 100, and is fed into the supply grid 20.

In addition the Figure shows an energy supply device 22 which can be connected by way of a switch 24 at its input 25 to the DC voltage intermediate circuit 14.

Energy generated by the generator 10 is thus fed to the energy supply device 22 after rectification by the rectifier 12, by way of the input 25. When the switch 24 is closed an energy storage device 26 in which energy is stored is connected to the DC voltage intermediate circuit 14. Besides that energy storage device 26 the DC voltage intermediate circuit 14 also has a plurality of capacitors (not shown) to store energy so that the energy storage device 26 represents an optional component part.

In accordance with the advantageous embodiment illustrated herein with the energy storage device 26 in addition to the capacitors which are in any case contained in the DC voltage intermediate circuit 14 substantially greater energy storage is possible than without an energy storage device. In emergency situations or in the start-up mode when no energy is generated by the generator 10 itself the energy storage device 26 thus serves to provide energy for the energy supply device 22 independently of the DC voltage intermediate circuit 14.

In addition provided in the energy supply device 22 is an inverter 28 which converts the DC voltage of the energy generated with the generator 10 from the DC voltage intermediate circuit 14 into an AC voltage. In contrast to the inverter 16 which generates a frequency of the voltage, that is suited for the feed into a grid, the inverter 28 is adapted to generate a voltage at a frequency suitable for supplying components of the wind turbine 100. Arranged at the output of the inverter 28 is a filter 30, namely a choke and/or one or more capacitors, which smooth the AC voltage produced with the inverter 28.

In addition there is provided a switch 32, by way of which, in the closed state thereof, the smoothed AC voltage is fed to the primary side of a transformer 34. The transformer 34 transforms the voltage into a voltage suitable for the supply to the components of the wind turbine 100. That is output at the output 36 of the secondary side of the transformer 34. Preferably by way of example 550 volts (V) or 500 V AC voltage is fed to the transformer 34 on its primary side and is output at the 400 V output 36 for supply for the components. In operation of the wind turbine 100 accordingly the switches 24 and 32 are closed.

The secondary side of the transformer 34 of the energy supply device 22 can be connected to the grid-side transformer 18 by way of switches 37 and 43. In the situation where no energy storage device 26 is provided or the energy storage device 26 is discharged and the wind turbine 100 is shut down, and is therefore not producing any energy, those switches 37 and 43 can be closed. Thus voltage can be taken from the supply grid 22 and converted by way of the secondary side of the transformer 34 into a supply voltage for supplying the components. That is then output at the output 36.

In the situation where there is no energy storage device 26 or the energy storage device 26 is discharged and the wind turbine 100 is shut down, energy can also be fed from the supply grid 20 to a rectifier 38 of the energy supply device 22 by way of the closed switch 37 and a further closed switch 42. That energy is then provided at a further output 41 for an exciter circuit 39 so that excitation of the generator 10 by way of a buck converter 40 of the exciter circuit 39 permits start-up of the wind turbine 100.

The energy provided by the supply grid 20 can thus be fed to a rectifier 38 which rectifies the energy from the grid and produces separate excitation of the generator 10 by way of a buck converter 40. For that purpose the supply grid 20 is connected to the rectifier 38 by way of the switch 42. In normal operation of the wind turbine 100, when therefore sufficient energy is fed by the generator 10 into the DC voltage intermediate circuit 14 and provided there, then the buck converter 40 is fed directly from the DC voltage intermediate circuit 14, the switch 42 then being opened. It is accepted here that upon a start-up procedure recourse is temporarily had to the fluctuating grid voltage as otherwise no start-up would be possible.

If the illustrated energy storage device 26 is present and charged and the wind turbine 100 is shut down then the switches 42 and 43 are opened and the switches 24 and 32 are closed for the start-up procedure. Accordingly the buck converter 40 can be supplied from the energy storage device 26 and accordingly excitation can be produced in the generator 10 so that the separately excited generator 10 begins to generate energy which is then fed into the DC voltage intermediate circuit 14. As soon as there is sufficient energy in the DC voltage intermediate circuit 14 the energy storage device 26 is charged again.

In addition the output 36 of the transformer 34 is connected to a main distribution system 44 for distributing the energy to components of the wind turbine 100. Then the energy output at the output 36 of the transformer 34 can be fed to components of the wind turbine 100 by way of the switches 46 to 54. A first component is for example a coolant pump 56 for pumping the cooling liquid for cooling the converters. Further components are the pitch drive 58 and the yaw drive 60. In addition a further component is a heat exchanger unit 62 for cooling the cooling liquid which is conveyed with the coolant pump. Furthermore a component is the so-called E-module 64 which includes for example a control device for controlling the inverter 16 to produce a grid-conforming alternating current. Furthermore the components include the electrical equipment of the tower 66 as well as the electrical equipment of the pod 104. The electrical equipment of the tower 66 and the electrical equipment of the pod 104 include for example lighting and ventilation installations in the tower 102 and the pod 104.

Further components connected to the output 36 of the transformer 34 are for example a control device of the E-module 70 and a control device of the pod 72. As those components 70 and 72 require a particular voltage further transformers 74 and 76 are respectively connected upstream of the components 70 and 72.

Figure 3:
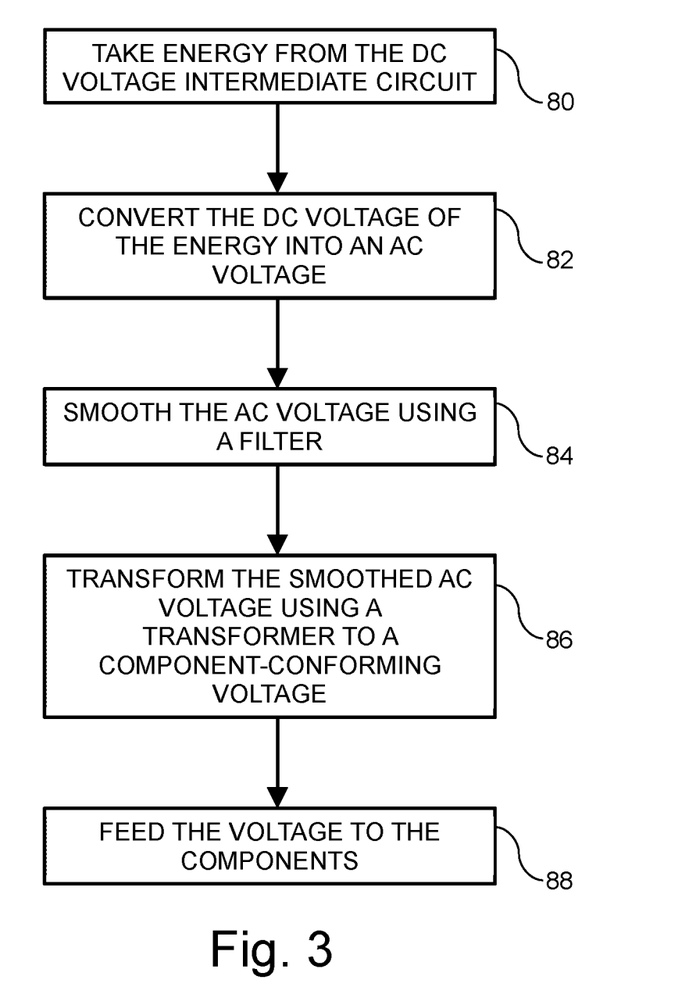
FIG. 3 shows the implementation of a method for supplying at least one component of a wind turbine with energy in operation of the wind turbine.

FIG. 3 shows the energy supply for the wind turbine 100 in normal operation, that is to say when the generator 10 is generating energy and feeding it into the DC voltage intermediate circuit 14 by way of the rectifier 12. In this case in step 80 energy is taken from the DC voltage intermediate circuit 14 and in step 82 the DC voltage of the energy is converted into an AC voltage. In a step 84 the AC voltage is smoothed with a filter 30, in particular a choke and/or at least one capacitor, while in step 86 the smoothed AC voltage is transformed with a transformer 34 into a component-conforming voltage. In step 88 the voltage is fed to the components 56-72 for supplying same.

Figure 4:
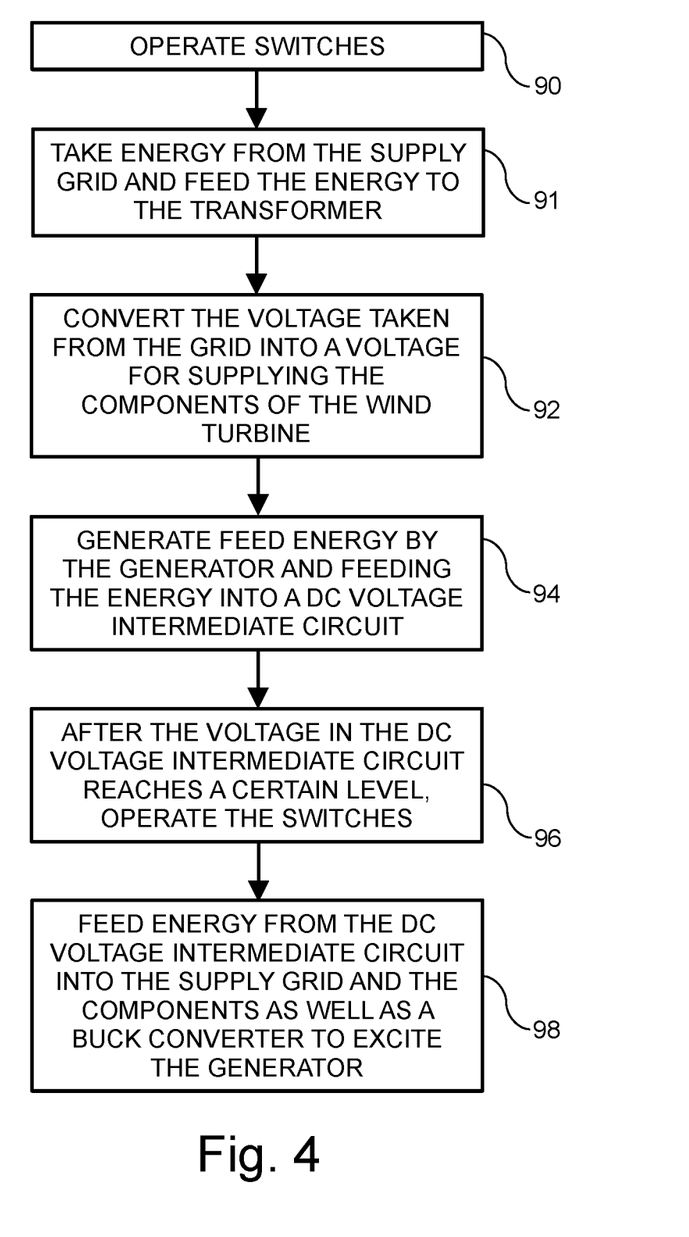
FIG. 4 shows the steps for starting a wind turbine without an energy storage device of an energy supply device.

FIG. 4 shows the steps for starting the wind turbine 100 without an energy storage device 26. In this case in a step 90 in which preferably switches 37 and 42 and 43 are closed and a switch 32 is opened, energy is taken by way of the transformer 18 from the supply grid 20 and fed to the transformer 34 in a step 91. The transformer 34 converts the voltage taken from the grid 20 in a step 92 into a voltage for supplying the components 56-72 of the wind turbine 100. In addition in step 92 energy from the supply grid 20 is provided for a rectifier 38 and a buck converter 40 for producing separate excitation of the generator 10. By virtue of rotation of the generator 10 it generates energy in step 94 and feeds it by way of the rectifier 12 into a DC voltage intermediate circuit 14. After the voltage in the DC voltage intermediate circuit 14 has reached a certain level then in step 96 preferably the switches 37 and 42 and 43 are opened and the switches 17 and 32 are closed. Now energy is fed from the DC voltage intermediate circuit 14 into the supply grid 20 and the components 56-72 as well as the buck converter 40 are fed to produce excitation for the generator 10 from the DC voltage intermediate circuit 14. That occurs in step 98.

According to an alternative in step 90 the switches 17, 32 and 42 are closed and the switch 43 is opened. Energy is taken from the supply grid 20 and fed to the transformer 34 and the exciter circuit 39 by way of the rectifier 38 in a step 91. The transformer 34 converts the voltage from the grid 20 in a step 92 into a voltage for supplying the components 56-72 of the wind turbine 100.

By virtue of these methods it is possible even in a maintenance or repair situation to provide a supply for the turbine components without the DC voltage intermediate circuit having to be charged. Thus there is the possibility of supplying voltage to only a few given turbine components while other components are safely separated from a voltage.

Figure 5:
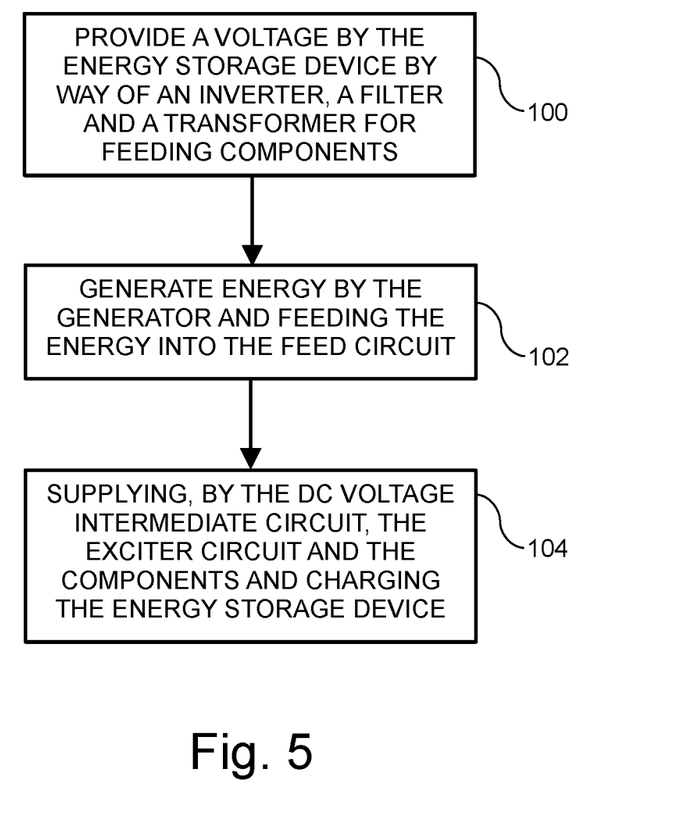
FIG. 5 shows the steps for starting a wind turbine with an energy storage device.

FIG. 5 shows a further method for starting a wind turbine 100 in the situation where there is an energy storage device 26. In that case a voltage is provided by the energy storage device 26 by way of an inverter 28, a filter 30 and a transformer 34 at the output of the transformer 34, for feeding the components 56-72. In addition the exciter circuit 39 provides the energy from the energy storage device 26. That is effected in step 100. In step 102 the generator 10 then generates energy and feeds it into the intermediate circuit 14. In step 104 the DC voltage intermediate circuit 14 then serves to supply the exciter circuit 39 and the components 56-72 in the manner described with reference to FIG. 3. The energy storage device 26 are also charged in that step.

The invention claimed is:

1. A method of supplying at least one component of a wind turbine with energy by an energy supply device, comprising:
   rectifying, by a rectifier, a voltage of energy generated by a generator;
   supplying the energy generated by the generator to an intermediate storage in a direct current (DC) voltage intermediate circuit;
   taking, by the energy supply device, the energy during operation of the wind turbine from the DC voltage intermediate circuit;
   converting, using a transformer of the energy supply device, a voltage of the energy taken from the DC voltage intermediate circuit into a voltage for the at least one component;
   supplying the energy to the at least one component of the wind turbine by the transformer, the supplying of the energy to the at least one component including:
      obtaining the energy from the DC voltage intermediate circuit on a primary side of the transformer; and
      providing, at a secondary side of the transformer, the energy to the at least one component; and
   providing, by the transformer, energy from a supply grid to the at least one component or an exciter circuit, wherein the transformer is coupled, at the secondary side, to the supply grid.

2. The method according to claim 1, comprising:
   converting, by an inverter of the energy supply device, the voltage of the energy taken from the DC voltage intermediate circuit for supplying the at least one component into an AC voltage, wherein the inverter of the energy supply device is different from an inverter configured to convert, into an AC voltage, a voltage of the energy provided in the DC voltage intermediate circuit for the supply grid.

3. The method according to claim 2, comprising:
   filtering the AC voltage converted using the inverter of the energy supply device.

4. The method according to claim 3, wherein filtering the AC voltage includes smoothing the AC voltage, and wherein a filter of the energy supply device is an inductance, choke and/or at least one capacitor.

5. The method according to claim 1 wherein the energy supply device includes an energy storage device that is an accumulator and the at least one component of the wind turbine or the exciter circuit of the wind turbine is supplied with energy from the energy storage device when the generator is not generating the energy.

6. The method according to claim 1 wherein when no energy is available in the DC voltage intermediate circuit or an energy storage device the at least one component or the exciter circuit is provided with the energy from the supply grid.

7. An energy supply device configured to perform the method according to claim 1.

8. The energy supply device according to claim 7, comprising:
   an input coupleable to the DC voltage intermediate circuit; and
   a first output configured to output the energy for supplying the at least one component.

9. The energy supply device according to claim 8, comprising:
   an inverter configured to convert a voltage of the energy supplied at the input into an AC voltage for the at least one component.

10. The energy supply device according to claim 9, comprising:
   a filter configured to smooth the AC voltage.

11. The energy supply device according to claim 10, wherein the filter is an inductance, choke or at least one capacitor.

12. The energy supply device according to claim 9, comprising:
   the transformer configured to transform the AC voltage into an AC voltage for supplying to the at least one component.

13. The energy supply device according to claim 8, comprising:
   a second output configured to output available energy for supplying to the exciter circuit of the wind turbine.

14. The energy supply device according to claim 7, comprising:
   an energy storage device coupled to the DC voltage intermediate circuit.

15. The energy supply device according to claim 14, comprising:
   the rectifier configured to provide the energy supplied by the energy supply device from the supply grid to the exciter circuit at a further output, the energy storage device or the at least one component.

16. A wind turbine, comprising:
the energy supply device according to claim 7.

* * * * *